United States Patent [19]

Kessler et al.

[11] Patent Number: 4,543,682
[45] Date of Patent: Oct. 1, 1985

[54] WINDSHIELD WIPER DEVICE FOR MOTOR VEHICLES

[75] Inventors: Peter-Jürgen Kessler, Sasbach; Jürgen Mayer, Gaggenau; Paul Weiler, Kappelrodeck, all of Fed. Rep. of Germany

[73] Assignee: Robert Bosch GmbH, Stuttgart, Fed. Rep. of Germany

[21] Appl. No.: 599,564

[22] Filed: Apr. 11, 1984

[30] Foreign Application Priority Data

May 20, 1983 [DE] Fed. Rep. of Germany ....... 3318425

[51] Int. Cl.⁴ .............................. B60S 1/04; B60S 1/38
[52] U.S. Cl. ................... 15/250.42; 15/250.36
[58] Field of Search ................... 15/250.36–250.42

[56] References Cited

U.S. PATENT DOCUMENTS

| 2,664,583 | 1/1954 | Oishei | 15/250.42 |
| 2,721,350 | 10/1955 | Oishei | 15/250.42 |
| 3,121,903 | 2/1964 | Ludwig | 15/250.42 |
| 4,388,742 | 6/1983 | Kimber et al. | 15/250.42 |
| 4,457,041 | 7/1984 | Kimber et al. | 15/250.42 |

Primary Examiner—Peter Feldman
Attorney, Agent, or Firm—Michael J. Striker

[57] ABSTRACT

In a windshield wiper device each wiper blade has a wiper element with a lip applied to a windshield to be wiped and a back portion held in an elastic rail made from elastic plastics. The wiper element is secured on the elastic rail against mutual displacement in the direction of elongation of the rail. A two-part yoke system which engages the elastic rail provides for a uniform distribution of contact pressures exerted on the wiper elements.

14 Claims, 11 Drawing Figures

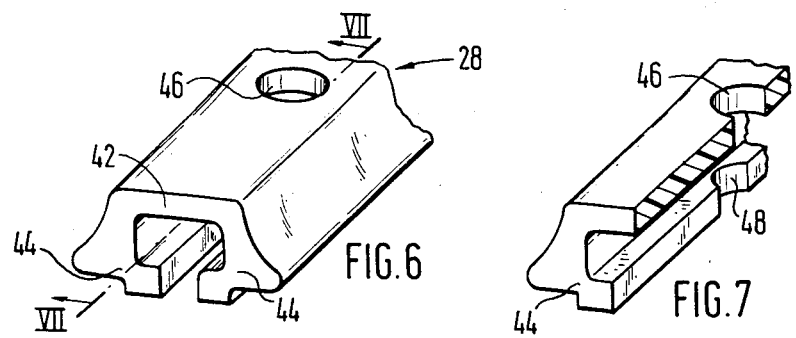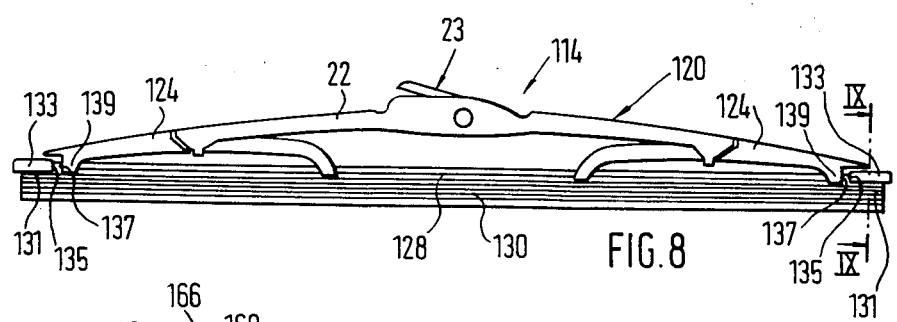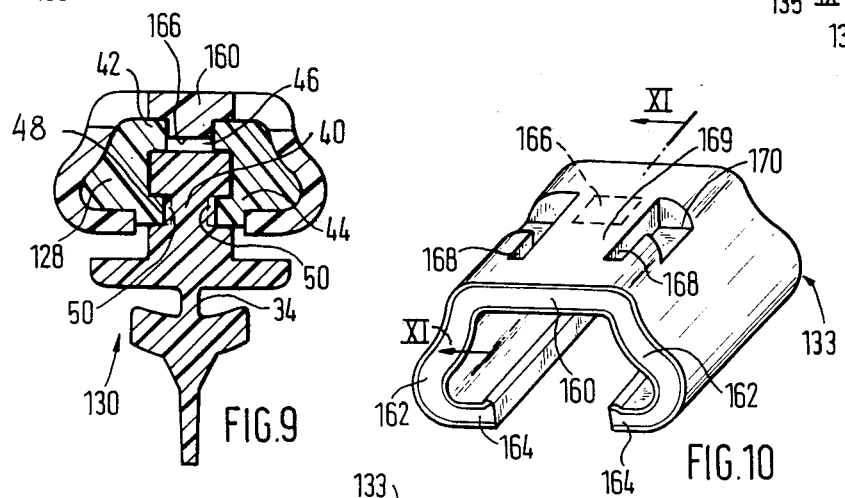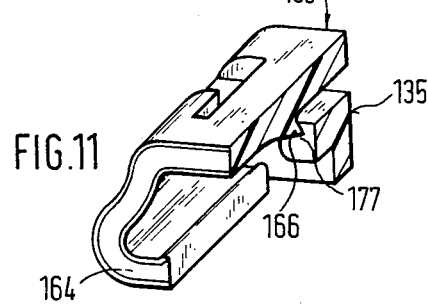

WINDSHIELD WIPER DEVICE FOR MOTOR VEHICLES

BACKGROUND OF THE INVENTION

The present invention relates to a windshield wiper device.

Windshield wiper devices, in which the elastic rail is connected immediately to the wiper arm of the device, are known in the art. In order to provide for effective contact pressures also at the end regions of each longitudinally extended wiper blade the elastic rail must have a number of reinforcing ribs. Such an arrangement however unfavorably affects the required elasticity of the wiper blade.

SUMMARY OF THE INVENTION

It is an object of the present invention to provide an improved windshield wiper device.

It is another object of the present invention to provide a wiper device in which contact pressure exerted onto the wiper blades is distributed over a number of points of application of the pressure and wherein the elastic rail would be supported elastically so that the wiper lips would continuously abut against the windshield or pane even if the latter is strongly curved and a reliable wiping and cleaning of the pane would be ensured.

These and other objects of the invention are attained by a wiper device for windshields of motor vehicles, comprising driven wiper arms and wiper blades each connected to a respective wiper arm, each wiper blade including an elongated wiper element having a wiper lip applied onto a windshield to be wiped off and a back portion connected to said wiper lip, an elongated elastic rail made of elastic plastics, said back portion being received in said elastic rail and secured therein against a lengthwise displacement relative to said elastic rail, a wiper blade-carrying yoke system having at least two portions engaged with said elastic rail, and means for connecting said yoke system to the respective wiper arm.

The elastic rail may be secured to said yoke system against a lengthwise displacement relative to said yoke system.

The yoke system may include a yoke element formed with a projection, said elastic rail being formed with an insertion bore receiving said projection.

Said projection may be a pin, said wiper element being formed with a recess, the pin passing through said insertion bore and extending into said recess.

The wiper element may further include a body portion connected to said lip, and a neck portion extended between said body portion and said back portion and formed to provide grooves between said back portion and said body portion, said elastic rail including two claw-shaped portions which surround said neck portion, whereby said claw-shaped portions are engaged in said grooves. The distance between said two claw-shaped portions may be smaller than the diameter of said bore.

Furthermore, the elastic rail may include a cross-piece connected with said claw-shaped portions, said bore being formed in said cross-piece and extended into said claw-shaped portions so that a recess is formed in each of said claw-shaped portion.

The neck portion may have two opposite lateral faces facing said claw-shaped and each formed with a projection engaged in the respective recess formed in each claw-shaped portion.

In the modified embodiment the elastic rail may have two stop shoulders spaced from each other lengthwise of said rail and said yoke system has two counter shoulders cooperating with said stop shoulders.

The yoke system may have at least two claws engaging the elastic rail, said counter shoulders being formed on said claws.

Furthermore, the elastic rail may have two end portions extending outwardly from the respective claws in the direction of elongation of said elastic rail.

Two locking members may be provided in the device, each connected to one of said end portions of said elastic rail.

Each of the locking members may have an inner face facing towards the inner face of another locking member, said claws each having an outer face facing away from the outer face of another claw, the distance between the inner faces of the locking members being greater than the distance between said outer faces of said claws.

Each locking member may include two leg portions and an intermediate portion interconnected between said leg portions, said leg portions being formed at free ends thereof with strip-like holding portions facing toward each other.

The locking members may be each arrestable with elastic rail.

The aforementioned intermediate portion may include an elastic portion, said elastic portion being formed with an arresting projection directed towards said elastic rail and engaged in a recess formed in the elastic rail.

Each locking member may be formed of elastic plastics.

Said intermediate portion may have two lateral slots formed at two sides of said arresting projection and extending in the direction of elongation of said rail, said slots forming therebetween said elastic portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 6 is a partial perspective view of an elastic rail of the wiper blade shown in FIG. 2;

FIG. 7 is a partial perspective view of the rail of FIG. 7 with a part shown in section taken along line VII—VII of FIG. 6;

FIG. 8 is a side view of the wiper blade according to another embodiment of the invention;

FIG. 9 is a sectional view taken along line IX—IX of FIG. 8, on an enlarged scale;

FIG. 10 is a perspective view of a locking element of the wiper blade illustrated in FIG. 8; and FIG. 11 is a partial perspective view of the locking element of FIG. 10 but with a cutout showing a section taken on line XI—XI of FIG. 10.

DETAILED DESCRIPTION OF THE PREFERRED EMBODIMENTS

Figure 1:
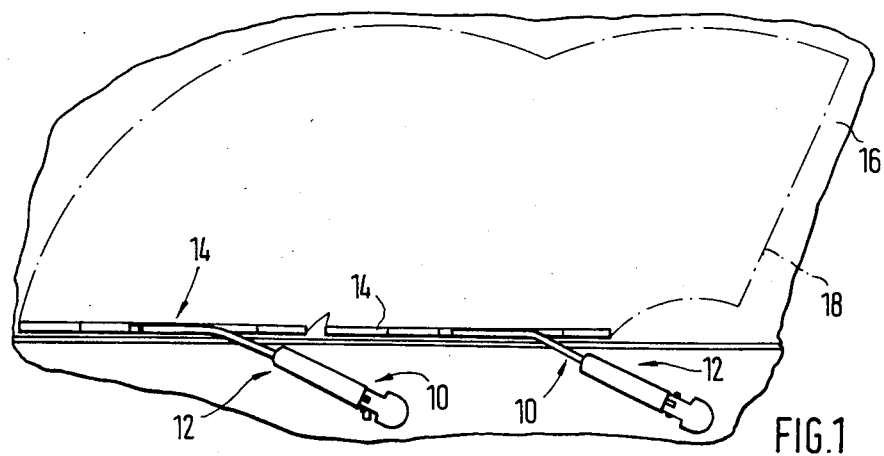
FIG. 1 is a front view of the windshield with a wiper device according to the invention thereon.

Referring now to the drawings in detail, the windshield wiper device includes two wipers 10 each of which has a driven wiper arm 12 carrying on the free end thereof a wiper blade 14. Wiper arms 12 are driven to oscillate against the pane so that each wiper blade sweeps on the pane or windshield a wiped area 18 of the shape of a circular segment as shown by a broken line in FIG. 1.

Figure 2:
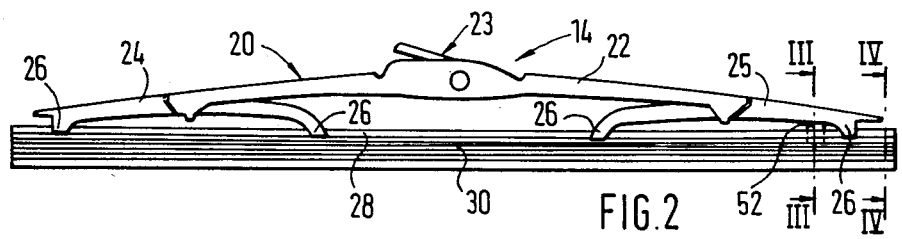
FIG. 2 is a side view of the wiper blade of the windshield wiper device.

FIG. 2 illustrates each wiper blade 14 in detail. Each blade includes a wiper-carrying yoke system 20 which has a central yoke 22 at the ends of which lateral claw-like yokes 24 and 25 are pivotally arranged in a swingletree manner. Central yoke 22 is provided with a connection means 23 for connecting the wiper blade 14 with the wiper arm 12. The lateral yokes 24, 25 have claw-shaped end portions 26 which engage and elastic rail 28 made of elastic plastics. A wiper element 30 is held in the elastic rail 28 in the manner described herein below.

The wiper element 30 as well as elastic rail 28 are longitudinal members. Each wiper element 30 formed of plastics has a central body 32 to which a wiper lip portion 36 via a deflectable cross-piece 34 is integrally connected. At the end of the wiper element opposite to the lip portion 36 is provided a back portion 38 which is integrally connected to central body 32 by a neck portion 40. The latter forms a constriction formed by means of grooves 43 between central body 32 and back portion 38. The elastic rail 28 has a substantially U-shaped cross-section and includes a cross-piece 42 and strip-like leg portions 44 integral with cross-piece 42 and acting as claws. These claws 44 are engaged in grooves 43 so that back portion 38 of the wiper element is surrounded by the elastic rail 28 as shown in FIGS. 3 and 4.

Figure 5:
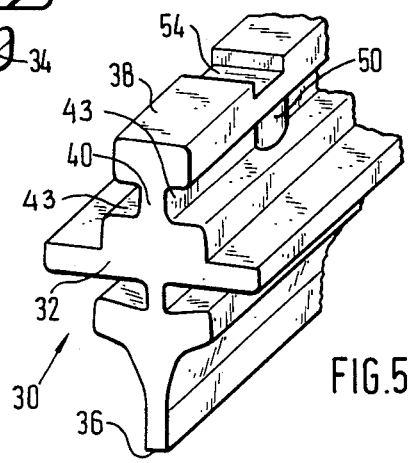
FIG. 5 is a perspective view of a wiper element of the wiper blade shown in FIG. 2.

With reference to FIGS. 6 and 7 it is seen that a bore 46 is provided in the cross-piece 42 of elastic rail 28, which bore extends into the region of leg portions or claws 44 so as to form in the opposite inner portions of claws 44 two recesses 48 facing each other. Projections 50 formed at two opposite lateral faces of neck portion 40 of the wiper element 5 as seen from FIG. 5 are engaged in respective recesses 48 so that the wiper element 30 is locked in the elastic rail 28 due to that engagement. Thereby the wiper element 30 is locked in elastic rail 28 against longitudinal displacement. Bore 46 in cross-piece 42 of the elastic rail serves the purpose of receiving a pin 52 which is preferably integrally connected to the lateral yoke 25 of yoke system 20. Pin 52 passes bore 46 in the elastic rail 28 and is engaged in a recess 54 formed as shown in FIGS. 3 and 5 in the back portion 38 of the wiper element 30. Pin 52 therefore locks the rail 28 and yoke system 20 against mutual displacement. Since the free end of pin 52 extends into the groove-shaped recess 54 in the back portion 38 of the wiper element 30 it also serves as an additional means for locking the wiper element 30 and rail 28 against mutual displacement.

Figure 3:
FIG. 3 is a sectional view taken along line III—III of FIG. 2 on enlarged scale.
Figure 4:
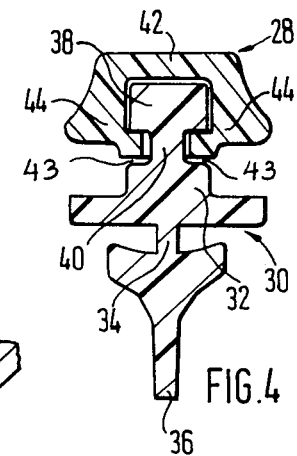
FIG. 4 is a sectional view taken along line IV—IV of FIG. 2, also on enlarged scale.

In the embodiment illustrated in FIGS. 8 to 11 the construction of the wiper blade 114 is similar to that of the wiper element 14 of FIG. 2 with the exception that pin 52 shown in FIGS. 2 and 3 is not provided on yoke 25 and there is no recess 54 in the back portion of the wiper element. The elastic rail denoted in this modified embodiment by reference character 128 and wiper element 130 extend similarly to the construction of FIGS. 2–7 longitudinally over the wiper-carrying yoke system 120. In order to lock the unit formed of the elastic rail 128 and wiper element 130 on the yoke system 120 two locking members 133 are arranged on two end portions 131 of the rail, which locking members extend outwardly from the yoke system 120 in the direction of elongation of elastic rail 128. Each locking member 133 has a stop shoulder 135 (also seen in FIG. 11) which cooperates with a respective opposite shoulder 137 provided on the assigned lateral yoke 124. The distance between the inner faces of locking members 133 facing towards each other is greater than the distance between the faces of the lateral yokes 139 facing away from each other. There is provided a predetermined distance between the stop shoulders 135 and opposite shoulders 137, which distance allows for a deflection of the elastic rail 128 and wiper element 130 connected therewith. This deflection is required to enable the wiper element to adjust to the curves or bucklings of the windshield to be wiped without any difficulties.

The locking members 133 as well as elastic rail 128 are formed of elastic plastics. Each locking member 133 has a substantially U-shaped configuration and includes two leg portions 162 and an intermediate portion 160 integral therewith. Lateral leg portions 162 merge into holding strip-like portions 164 facing towards each other. Locking elements 133 are so adjusted that they are pushed on the elastic rail 128 to engage the latter. The rail 128 has cross-piece 42 (FIG. 9), similarly to the embodiment of FIG. 3–7. The intermediate portion 160 of each locking member 133 has at the side thereof facing the elastic rail 128 a locking projection 166 which is engaged in bore 46 provided in cross-piece 42 of rail 128. In order to make locking projection 166 elastically hingeable the intermediate portion 160 is provided in the region of projection 166 with two lateral grooves 168 which extend in the direction of elongation of elastic rail 128 so as to form therebetween an elastic portion 169. Locking or arresting projection 166, as seen from FIG. 11, has a shape of a saw tooth. When, upon pushing locking elements 133 onto the elastic rail 128, sloped rear flanks 177 of respective locking projections 166 come into contact with cross-piece 42 of elastic rail 128 the elastic portion 169 together with the locking projection 166 of the intermediate portion 160 of each locking member 133 will bend outwardly unless the locking members 133 will come to predetermined operation positions in which the locking projections 166 of both locking members 133 will be engaged and locked in respective bores 46 provided in cross-piece 42 of elastic rail 128. Each bore 46 for each locking member 133 extends in the direction of claws 44 similarly to the embodiment of FIGS. 2–7 so that recesses 48 are formed in respective opposite inner portions of claws 44, in which lateral projections 50 formed on the neck portion 40 of the wiper element 130 are locked. These projections 50 ensure locking against a mutual displacement between elastic rail 128 and wiper element 130. Both locking members 133 lock the unit comprised of elastic rail 128 and wiper element 130 on the yoke system 120. In order to enable locking members 133 to be released from elastic rail 128 each groove 168 has an elongated extension 170 as shown in FIG. 10, which extends laterally of groove 168 into the region of respective leg portion 162. Thereby it is possible to lift the intermediate portion 160 of each member 133 with the aid of a suitable tool from the rail 128 so that the locking projection 166 will be pulled out from the receiving bore 46 and the locking member would be separated and released from the elastic rail 128.

The common features of the both embodiments of the wiper blades discussed herein above are that at least two-part yoke system 20 or 120 is applied to the elastic rail 28 or 128 and that a connection means 23 for connecting the wiper blade 14 or 114 to the driven wiper arm 12 is provided. Furthermore, in the both instances the yoke system 20 or 120 assigned to the respective wiper blade and the unit comprised of the elastic rail 28 or 128 and the wiper element 30 or 130 are secured against mutual lengthwise displacement.

In the embodiment of FIG. 2 the means for securing against mutual displacement is pin 52 of the lateral yoke 25, which pin is inserted into bore 46 of elastic rail 28. In the embodiment of FIG. 8 such a securing is provided by two locking members 133 which are pushed on the end portions 131 of elastic rail 128 and secured to the latter. It is to be understood that the above described securing against lengthwise displacement between yoke system 20 and the wiper element ensures that the unit formed of the elastic rail and the wiper element can not be unintentionally released from the wiper-carrying yoke system 20 or 120.

It will be understood that each of the elements described above, or two or more together, may also find a useful application in other types of windshield wiper devices for motor vehicles differing from the types described above.

While the invention has been illustrated and described as embodied in a windshield wiper device for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A wiper device for windshields of motor vehicles, comprising driven wiper arms and wiper blades each connected to a respective wiper arm, each wiper blade including an elongated wiper element having a wiper lip applied onto a windshield to be wiped off and a back portion connected to said wiper lip, an elongated elastic rail made of elastic plastics, said back portion being received in said elastic rail and secured therein against a lengthwise displacement relative to said elastic rail, a wiper blade-carrying yoke system having at least two portions engaged with said elastic rail, said elastic rail being secured against a lengthwise displacement relative to the yoke system, and means for connecting said yoke system to the respective wiper arm, said yoke system including a yoke element formed with a pin, said elastic rail being formed with an insertion bore receiving said pin, said wiper element being formed with a recess, said pin passing through said insertion bore and extending into said recess, said wiper element further including a body portion connected to said lip, and a neck portion extended between said body portion and said back portion and formed to provide grooves between said back portion and said body portion, said elastic rail including two claw-shaped portions which surround said neck portion whereby said claw-shaped portions are engaged in said grooves, and a cross-piece connected with said claw-shaped portions, said bore being formed in said cross-piece and extended into said claw-shaped portions so that a recess is formed in each of said claw-shaped portion, said neck portion having two opposite lateral faces facing said claw-shaped portions and each formed with a projection engaged in the respective recess formed in each claw-shaped portion.

2. The device as defined in claim 1, wherein the distance between said two claw-shaped portions is smaller than the diameter of said bore.

3. A wiper device for windshields of motor vehicles, comprising driven wiper arms and wiper blades each connected to a respective wiper arm, each wiper blade including an elongated wiper element having a wiper lip applied onto a windshield to be wiped off and a back portion connected to said wiper lip; an elongated elastic rail made of elastic plastics, said back portion being received in said elastic rail and secured therein against a lengthwise displacement relative to said elastic rail; a wiper blade-carrying yoke system having at least two portions engaged with said elastic rail, means for connecting said yoke system to the respective wiper arm, said elastic rail being secured to said yoke system against a lengthwise displacement relative to the yoke system, said wiper element further including a body portion connected to said lip, and a neck portion extended between said body portion and said back portion and formed to provide grooves between said back portion and said body portion, said elastic rail including two claw-shaped portions which surround said neck portion, said elastic rail further including a cross-piece connected with said claw-shaped portions, said neck portion having two opposite lateral faces facing said claw-shaped portions and each formed with a projection engaged in the respective recess formed in each claw-shaped portion, said elastic rail having two end portions extending outwardly from the respective claws in the direction of elongation of said elastic rail; and two locking members each connected to one of said end portions of said elastic rail.

4. The device as defined in claim 3, wherein said elastic rail has two stop shoulders spaced from each other lengthwise of said rail and said yoke system has two counter shoulders cooperating with said stop shoulders.

5. The device as defined in claim 4, wherein said yoke system has at least two claws engaging said elastic rail, said counter shoulders being formed on said claws.

6. The device as defined in claim 5, wherein each of said locking members has an inner face facing towards the inner face of another locking member, said claws each having an outer face facing away from the outer face of another claw, the distance between the inner faces of the locking members being greater than the distance between said outer faces of said claws.

7. The device as defined in claim 5, wherein each locking member includes two leg portions and an intermediate portion interconnected between said leg portions, said leg portions being formed at free ends thereof with strip-like holding portions facing toward each other.

8. The device as defined in claim 7, wherein said locking members are each engaged on said elastic rail.

9. The device as defined in claim 8, wherein said locking members are each arrestable with said elastic rail.

10. The device as defined in claim 9, wherein said intermediate portion includes an elastic portion, said elastic portion being formed with an arresting projection directed towards said elastic rail.

11. The device as defined in claim 10, wherein said elastic rail is formed with an insertion bore in which said arresting projection is engaged.

12. The device as defined in claim 11, wherein each of said locking members is formed of elastic plastics.

13. The device as defined in claim 12, said intermediate portion having two lateral slots formed at two sides of said arresting projection and extending in the direction of elongation of said rail, said slots forming therebetween said elastic portion.

14. The device as defined in claim 13, wherein each of said slots has a longitudinal portion extended into the respective leg portion of the locking member.

* * * * *